United States Patent [19]

Sato et al.

[11] Patent Number: 5,048,745

[45] Date of Patent: Sep. 17, 1991

[54] ROLL STAMPER FOR MOLDING SUBSTRATE USED FOR OPTICAL RECORDING MEDIUM, PROCESS FOR PREPARING SAME, AND PROCESS FOR PREPARING OPTICAL RECORDING MEDIUM MAKING USE OF IT

[75] Inventors: Tetsuya Sato; Osamu Kanome, both of Kawasaki; Masataka Yashima, Yokohama; Hiroyuki Sugata, Yamato, all of Japan

[73] Assignee: Canon Kabushiki Kaishi, Tokyo, Japan

[21] Appl. No.: 514,721

[22] Filed: Apr. 26, 1990

[30] Foreign Application Priority Data

| Apr. 26, 1989 | [JP] | Japan | 1-104688 |
| Apr. 26, 1989 | [JP] | Japan | 1-104689 |
| Apr. 26, 1989 | [JP] | Japan | 1-104690 |

[51] Int. Cl.$^5$ ............................................. B29D 17/00
[52] U.S. Cl. ................................. 228/132; 264/106; 264/107
[58] Field of Search ............... 228/152, 173.1, 132; 264/106, 107, 1.3; 249/135

[56] References Cited

U.S. PATENT DOCUMENTS

| 4,408,319 | 10/1983 | Tsunoda | 264/106 |
| 4,565,772 | 1/1986 | Takeoka et al. | 264/107 |
| 4,836,874 | 6/1989 | Foster | 264/106 |
| 4,845,000 | 6/1989 | Takeoka et al. | 264/107 |
| 4,968,370 | 11/1990 | Watkins | 264/106 |

FOREIGN PATENT DOCUMENTS

| 0171003 | 9/1984 | Japan | 264/107 |
| 0180801 | 10/1984 | Japan | 264/106 |
| 0186154 | 10/1984 | Japan | 264/1.3 |
| 0193560 | 11/1984 | Japan | 264/107 |
| 0182532 | 9/1985 | Japan | 264/107 |

Primary Examiner—Richard K. Seidel
Assistant Examiner—James Miner
Attorney, Agent, or Firm—Fitzpatrick, Cella, Harper & Scinto

[57] ABSTRACT

A roll stamper for continuously preparing a substrate used for optical recording mediums, having a convexity and concavity preformat pattern, is prepared by a process comprising the steps of forming a low-melting metal layer on a roll substrate, and forming an auxiliary layer comprising a material different from that of a stamper, on the back of the stamper having on its surface a pattern corresponding with a convexity and concavity preformat pattern. The stamper is overlaid on the roll substrate in such a manner that the low-melting metal layer comes into contact with the auxiliary layer, and thereafter the low-melting metal layer is melted so that the stamper is fixed to the roll substrate.

2 Claims, 3 Drawing Sheets

ROLL STAMPER FOR MOLDING SUBSTRATE USED FOR OPTICAL RECORDING MEDIUM, PROCESS FOR PREPARING SAME, AND PROCESS FOR PREPARING OPTICAL RECORDING MEDIUM MAKING USE OF IT

BACKGROUND OF THE INVENTION

1. Field of the Invention

The present invention relates to a roll stamper used for molding a substrate for an optical recording medium, which is used for forming convexity and concavity for preformat signals or guide grooves for tracking signals, on a substrate used for a high-density information recording medium such as an optical disk or an optical card. It also relates to a process for preparing the roll stamper, and a process for preparing an optical recording medium making use of it.

2. Related Background Art

Substrates for optical recording mediums have been hitherto prepared by methods such as injection molding and compression molding. These methods, however, can not achieve sufficient flatness or smoothness of a substrate and also tend to cause warpage or inclusion of bubbles, thus bringing about the problem that the detection of information with light may be greatly inhibited. To avoid such a problem, great difficulties are involved in conditioning temperature and pressure at the time of manufacture, assuring accuracy of a mold, or preventing generation of bubbles, and also an apparatus with a large scale is required, resulting in a great increase in cost.

Moreover, substrates are formed sheet-by-sheet in compression molding, and hence complicated post-processing is required, bringing about a problem of poor productivity.

On the other hand, use of a flat sheet made of plastics enables easy manufacture of a smooth and uniform sheet having no bubbles, and hence a method has been proposed in which a stamper is brought into close contact with a plastic flat sheet under application of pressure to transfer grooves to the sheet. However, a very high pressure must be used in order to apply pressure over the whole disc surface of a flat sheet.

As a means for solving this problem, a method has been proposed in which a plastic sheet extruded from an extruder is passed between a roll stamper and a pressure roll, grooves corresponding to the stamper are thereby formed on the plastic sheet under a low pressure, and then center holes and peripheries of groove patterns thus formed are cut away, whereby substrates for optical recording mediums can be continuously obtained.

As roll stampers used in such a method of continuously preparing substrates for optical recording mediums, it has been proposed to use a stamper comprising a roll substrate having preformat patterns directly formed thereon or a stamper comprising a thin stamper stuck on a roll substrate with an adhesive or the like, as disclosed in pending U.S. Ser. No. 186,145. Of these, the stamper comprising a thin stamper fixed to the roll substrate can be readily prepared, compared with the stamper having preformat patterns directly formed thereon, and has the advantage that, when the stamper is broken, the broken stamper may be replaced with new one and the original roll stamper can be used again.

Use of this method, however, has involved the problem that, differently from a conventional flat sheet stamper, a strong force is always applied to the stamper provided on the roll substrate, in the transport direction of a resin sheet, so that the stamper tends to be peeled from the roll substrate or the stamper is stretched in the transport direction of the resin sheet As a conventional means for fixing a stamper to a roll substrate, it is known that, as described in Japanese patent application Laid-Open Sho 56-86721, the stamper is mechanically fixed with screws, or adhered with an adhesive. In the instance where the stamper is fixed by a mechanical means, a gap tends to form between the roll substrate and the stamper because of the stretch of the stamper. Thus, there has been a problem in flatness. In addition, when a preformat is transferred to a plastic sheet, the roll stamper is heated with a heating medium inserted to the center of a roll substrate. Then, there is another problem that the heat conduction to the stamper may be non-uniform because of the gap between the roll substrate and the stamper and hence the preformat can not be readily transferred.

In the instance where the stamper is adhered with an adhesive, the heating of a roll stamper may cause deterioration of the adhesive, and hence there is also a problem in firmly fixing the stamper to the roll substrate for a long period of time. Moreover, no adhesives have been available as to those which can absorb the stretch of the stamper and may cause the deterioration due to heat with difficulty.

SUMMARY OF THE INVENTION

The present invention was made to solve such problems involved in the prior art. An object of the present invention is to provide a roll stamper for continuously forming substrates used for optical recording mediums, having a convexity and concavity preformat pattern, which is a roll stamper comprising a stamper that can be firmly secured on a roll substrate for a long period of time.

Another object of the present invention is to provide a process for preparing a roll stamper for molding a substrate used for an optical recording medium, which can further improve close contact between a roll substrate and a stamper.

Still another object of the present invention is to provide a process for preparing a substrate used for an optical recording medium, which can achieve accurate and uniform transfer of a preformat pattern and also achieve excellent mass productivity.

According to the present invention, the roll stamper comprises a roll substrate and a stamper fixed thereto having a convexity and concavity preformat pattern, wherein;

said stamper has an auxiliary layer comprising a material different from that of the stamper on the back of the surface on which the convexity and concavity preformat pattern is formed; and said roll substrate has a low-melting metal layer on its surface;

said auxiliary layer being brought into contact with said low-melting metal layer so that the stamper is fixed to the roll substrate.

The process for preparing a roll stamper according to the present invention is a process for preparing a roll stamper for continuously preparing substrates used for optical recording mediums, having a convexity and concavity preformat pattern, comprising the steps of;

forming a low-melting metal layer on a roll substrate;

forming an auxiliary layer comprising a material different from that of the stamper on the back of a stamper having on its surface a pattern corresponding with the convexity and concavity preformat pattern;

overlaying said stamper on said roll substrate in such a manner that said low-melting metal layer comes into contact with said auxiliary layer; and thereafter melting said low-melting metal layer so that the stamper is fixed to the roll substrate.

The process for preparing a substrate used for an optical recording medium comprises continuous steps of;

melting a resin and extruding the molten resin to form a resin sheet;

and pressing said resin sheet, before it cures, between a roll stamper and a pressure roll disposed opposite to said roll stamper, to transfer a preformat pattern to said resin sheet;

wherein;

said roll stamper comprises a roll substrate and having thereon a stamper on which the preformat pattern has been formed;

said stamper has an auxiliary layer on the back of the surface on which the preformat pattern has been formed; and said roll substrate has a low-melting metal layer on its surface;

said auxiliary layer being brought into contact with said low-melting metal layer so that the stamper is fixed to the roll substrate.

Briefly stated, the stretch of the stamper can be absorbed because of the low-melting metal layer used as an adhesive layer, and the adhesion of the stamper to the roll substrate can be improved because of the auxiliary layer provided.

DETAILED DESCRIPTION OF THE INVENTION

The present invention will be specifically described below in detail.

Figure 1:
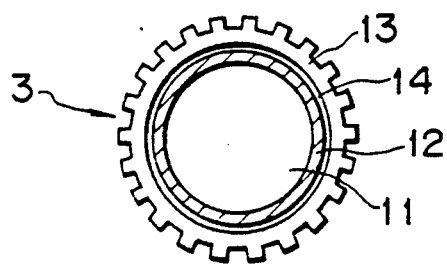
FIG. 1 is a diagramatic cross-sectional view to illustrate an example of the roll stamper of the present invention.

FIG. 1 is a diagramatic cross-sectional view to illustrate an example of the roll stamper of the present invention. In FIG. 1, a roll stamper 3 according to the present invention is provided on the back of a stamper 13 with an auxiliary layer comprising a metal or alloy of the type different from the material for the stamper. On the surface of a roll substrate 11, a low-melting metal layer 12 is also provided. The auxiliary layer 14 of the stamper 13 is brought into close contact with the low-melting metal layer 12 so that the stamper 13 is fixed to the surface of the roll substrate 11.

In the present invention, the roll stamper is heated at a high temperature when a preformat pattern is formed on a plastic sheet, for example, at a temperature of from 120° C. to 150° C. in the case when a convexity and concavity preformat pattern is formed on a polycarbonate sheet. Hence, the low-melting metal layer 12 should preferably have a melting point higher than the temperature at which the roll stamper is heated, and not higher than 1,000° C. Soldering alloys as exemplified by alloys of Sn, Pb and In are used. Composition of such low-melting metal may be varied depending on roll temperature.

For example, in instances in which a polycarbonate resin is molded, where the roll stamper is heated at 120° to 150° C. as mentioned above, the low-melting metal layer 12 should preferably comprise a material having a melting point of from 150° to 1,000° C., and particularly from 200° to 500° C. The material used in the low-melting metal layer under such conditions includes, for example, soldering alloys and waxes such as silver wax. In particular, the soldering alloys are preferred because they soften at a temperature around the temperature at which the resin is molded and can well absorb the stretch of a stamper. The soldering alloys specifically include, for example, 10Sn-90Pb, 5Sn-95Pb, 2Sn-98Pb, 25In-75Pb, 2.5Ag-5In-92.5Pb, and 8Sn-90Pb-2Ag.

The low-melting metal layer having a thickness as small as possible can have better thermal conductivity, less non-uniformity in thickness, better flatness of the surface, and better durability. For these reasons, the low-melting metal layer should have a thickness of not more than 100 μm.

Metals, semiconductor dielectrics or alloys are used as the material used in the roll substrate 11 of the present invention. Particularly preferred are materials capable of being planished, such as aluminum, hard metals, mold steels (as exemplified by marageing steel). Cr steel, which can be readily planished, is preferably used.

Next, referring to the stamper 13, usual metals can be used without any particular limitations. In particular, nickel is preferred. A stamper having an excessively large thickness makes it necessary for a roller to have a large diameter, resulting in enlargement in size of an apparatus. A stamper having an excessively small thickness may result in a loss in stiffness of the stamper. Hence, the stamper may suitably have a thickness of from 50 to 500 μm.

The stamper can be prepared by commonly known methods. The stamper, when prepared, for example, by Ni sputtering (a treatment to make it conductive) or Ni electroforming by the use of a glass master, may preferably be mirror-polished on its back surface before the stamper is peeled from the glass master.

Next, at least one layer of auxiliary layer 14 comprising a metal or alloy different from the material for the stamper is formed on the back surface of the stamper 13.

The metal or alloy used in the auxiliary layer 14 may preferably include materials having good adhesion to the stamper and a good wettability to the low-melting metal (including alloy also) coming into contact therewith. For example, silver, copper or a copper alloy is preferred when soldering alloys are used as the low-melting metal. A coating of tin or the like may further be formed thereon.

The auxiliary layer may be formed by, for example, sputtering, vacuum deposition, chemical plating or electrical plating. The auxiliary layer may have a thickness of not more than 10 μm, and preferably from 0.1 to 5 μm.

Figure 2:
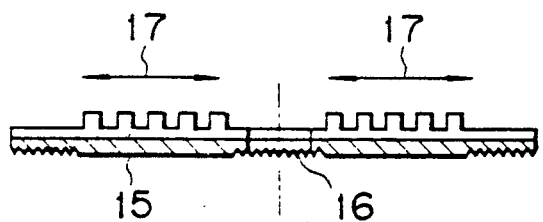
FIG. 2 is a view to illustrate a stamper the back surface of which has been roughened.
Figure 3:
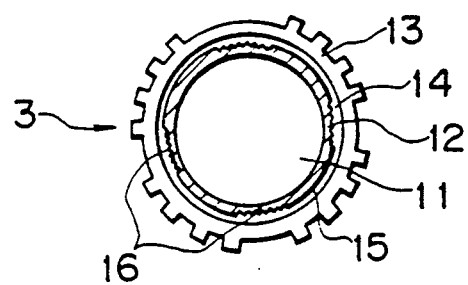
FIG. 3 is an illustration of a roll stamper employing the stamper illustrated in FIG. 2.

As illustrated in FIG. 2, the stamper of the present invention may also comprise an auxiliary layer having a roughened-surface area 16 on its back surface at the area corresponding to the part at which no convexity and concavity preformat pattern is provided on the surface of the stamper. In such an instance, the adhesion between the stamper and the roll substrate can be improved when the roll stamper is formed as illustrated in FIG. 3. This is preferred. Here, the back surface at the area corresponding to the part at which a groove preformat pattern is provided on the surface of the stamper may preferably have a mirror-surface area 15, mirror-finished so that a pattern can be accurately transferred. Specifically, the mirror-surface area 15 may preferably have a surface roughness of not more than 1 μm from the viewpoint of accurate transfer of a preformat pattern. The roughened-surface area 16 may preferably have a surface roughness of not less than 10 μm, and particularly from 15 μm to 50 μm.

Specifically, in preparing such a stamper, a glass master is coated with a resist, a pattern is then exposed to light using a laser and developed, and a film of nickel is thereafter formed by sputtering, followed by electro-forming to deposit nickel to a given thickness. The stamper with glass, thus obtained, is mirror-finished by polishing on its back surface, and then the part corresponding to the part at which convexity and concavity are present is covered with tape or the like. Thereater, the back surface is roughened at the part other than the part covered with the tape, by chemical polishing or sand spraying or with sand paper. Next, the stamper is peeled from the glass. The stamper as described above can be thus obtained.

In the above steps, in place of the surface-roughening carried out using sand paper, the surface can also be roughened by etching using a nickel etchant after the mirror-surface area is protected with a silicone tape.

A process for preparing the roll stamper of the present invention will be described below.

The stamper 13 having the auxiliary layer, as prepared in the above, is overlaid on the roll substrate 11 having the low-melting metal layer, in the manner that the auxiliary layer comes into contact with the low-melting metal layer. Thereafter, the light-sensitive material is melted. Thus, the stamper can be fixed to the roll substrate.

Figure 4A:
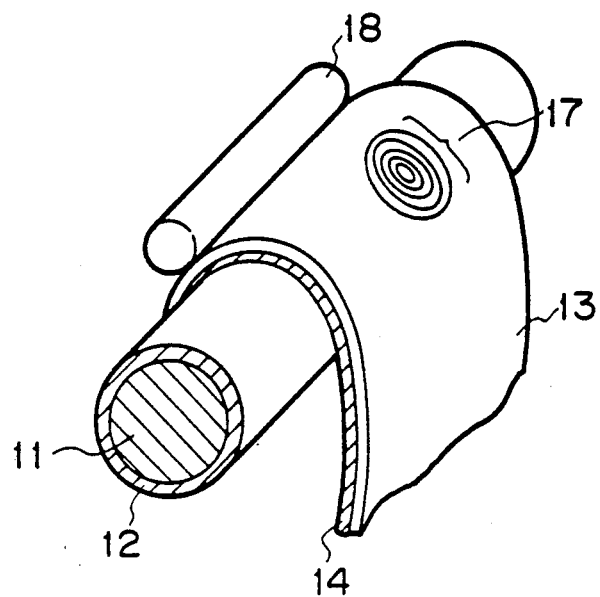
FIGS. 4A and 4B schematically illustrate a process by which the roll stamper of the present invention is prepared.
Figure 4B:
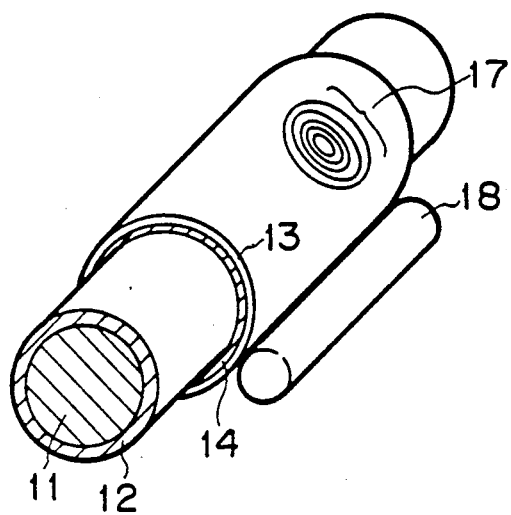

Specifically, as shown, for example, in FIGS. 4A and 4B, a heated roll 18, heated to a temperature higher than the melting point of the low-melting metal layer, is rotationally moved on the stamper 13 overlaid around the low-melting metal layer 12, under application of pressure. The low-melting metal layer is thus melted, so that the stamper can be fixed to the roll substrate. Particularly when this method is employed, the low-melting metal layer is melted under application of pressure. It is hence possible to fix the stamper to the roll substrate while keeping uniform the thickness of the low-melting metal layer. This enables uniform conduction of heat to the surface of the stamper when a resin sheet is molded under application of heat to the roll stamper, and hence it is possible to give a roll stamper that can transfer a convexity and concavity preformat pattern to the resin sheet with good accuracy.

In the above process, the pressure applied for pressing the stamper to the roll substrate by means of the heated roll 18 may vary depending on what materials are used in the low-melting metal layer. It may preferably be in the range of from 0.1 kg/cm to 5 kg/cm, and particularly from 0.5 to 2 kg/cm, in linear pressure.

Alternatively, the heated roll 18 may be set stationary, where the roll substrate 11 is rotated. In such an instance, at least one end of the stamper should be provisionally fixed with an adhesive, screws, a metal belt or the like.

Still alternatively, a heat-shrinkable tube or an elastic material may be wrapped around the roll substrate 11 from the outside of the stamper in the manner that the entire roll substrate may be covered therewith, which are then heated for a given period of time at a temperature higher than the melting point of the low-melting metal so that the roll substrate 11 and the stamper with the auxiliary layer may be fixed.

Using the roll stamper thus obtained, substrates used for optical recording medium are continuously prepared.

Figure 5:
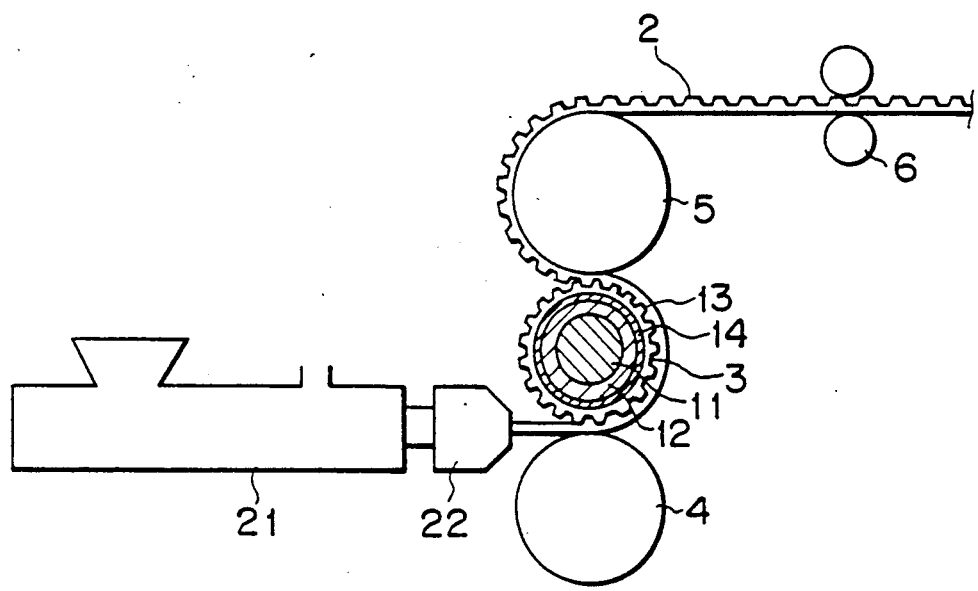
FIG. 5 illustrates an example of an apparatus used for carrying out the process for preparing a substrate used for an optical recording medium, in which the roll stamper of the present invention is used.

FIG. 5 is a diagramatic cross-sectional view to illustrate an embodiment of a process for continuously preparing substrates used for optical recording mediums, in which the roll stamper of the present invention is used.

In the present embodiment, resin pellets fed into an extruder 21 are first heated and melted in a barrel of the extruder 21, pressed forward by a screw provided inside the extruder, and then formed into a sheet through a T-die 22. In order to enable accurate transfer of a preformat pattern, the T-die may preferably be so disposed that a resin sheet 2 is extruded to the gap between a roll stamper 3 and a pressure roll 4.

Subsequently, the resin sheet extruded from the T-die is pressed between the roll stamper and the pressure roll 4, and thus a preformat pattern is transferred. Here, the resin sheet 2 may preferably be almost in a molten state. This is because the resin can be well pressed into the uneven surfaces of the stamper and hence a fine pattern can be accurately transferred. For this reason, the T-die may preferably be kept heated to a temperature as high as possible so far as the resin may not be burnt and stuck to the T-die, and may preferably be heated to a glass transition temperature of the resin (hereinafter "Tg")+110° C. to Tg+200° C., and particularly Tg+130° C. to Tg+190° C. For example, in the case of polycarbonate resins, it may preferably be heated to from 260° C. to 340° C., particularly from 280° C. to 330° C., and more particularly from 290° to 320° C. In addition, since the preformat pattern may not be satisfactorily transferred, tending to cause birefringence, when the resin sheet is cooled between the T-die and the roll stamper, the distance between the T-die and the point at which the resin sheet is pressed between the roll stamper 3 and the first pressure roll 4 may preferably be not more than 20 cm, particularly not more than 15 cm, and more particularly 10 cm or less. Their surrounding atmosphere should also preferably be kept at a temperature of 60° C. or higher.

The apparatus may also preferably have the constitution of vertical extrusion, where the resin sheet is pressed between the rolls at the point vertically beneath the T-die so that the resin sheet can be correctly extruded to that point. This is because the vertical extrusion enables more correct extrusion than horizontal extrusion, of the resin sheet to the point where it is pressed between the rolls since the resin is nearly in a molten state.

The roll stamper 3 and pressure rolls 4 and 5 may have temperatures commonly used in extrusion of resin sheets, i.e., temperatures of from 80° C. to 160° C.

The thickness of the resin sheet serving as the substrate used for the optical recording medium of the present invention can be varied by variation of the space between the roll stamper 3 and the pressure roll 4 or 5. However, in view of the advantages that little strain may be produced inside the resin sheet and the convexity and concavity preformat pattern can be transferred with good performance, the resin sheet may preferably have a thickness of from 0.2 mm to 2.0 mm, and particularly from 0.4 mm to 1.5 mm. The rolls 3, 4 and 5, on which the thickness of this sheet depends, are so set as to be as parallel as possible to each other in order to prevent the irregularities in sheet thickness that may cause errors in recording and reproduction. Stated specifically, assuming as $\theta$ the angle formed by the axis of each roll, it is preferred that tan $\theta$ is $5 \times 10^{-3}$ or less, and particularly $1 \times 10^{-3}$ or less.

The birefringence of the resin sheet brings about great trouble when an energy beam used for the recording and reproduction is made incident from the substrate side. Hence, the birefringence of the resin sheet should preferably be controlled to be 50 nm or less, particularly 30 nm or less, and more particularly 20 nm or less, further more particularly 15 nm or less, in terms of the wavelength of light used for the recording and/or reproduction.

As to the transport speed of the resin sheet, the resin sheet may preferably be delivered at a speed that may not cause the resin to cure before formation of the preformat pattern and also may not result in uneven transfer of the preformat pattern. In this regard, as the speed that enables accurate transfer of the preformat pattern, the transport speed of the resin sheet may preferably in the range of from 0.3 m/min to 10 m/min, particularly from 0.5 m/min to 5 m/min, and more particularly from 1 m/min to 4 m/min.

Incidentally, in order to decrease the birefringence and improve the flatness of the resin sheet, the amount of extrusion to form the resin sheet may preferably be accurately controlled. It is also preferred to cause no tension to be applied to, and no sag to be produced in, the resin sheet in the course of the formation of the preformat pattern. This can be achieved by adjusting the rotational speeds of the roll stamper 3 and the third roll pressure roll 5. Assuming the rotational speed of the roll stamper 3 as $\omega_3$, and the rotational speed of the pressure roll 5 as $\omega_5$, the speed ratio $\omega_3/\omega_5$ of the rotational speeds (peripheral speeds) of the rolls may preferably be $1.0 < \omega_3/\omega_5 \leq 1.004$, particularly $1.001 < \omega_3/\omega_5 \leq 1.003$, and more particularly $1.001 < \omega_3/\omega_5 \leq 1.0025$.

When $\omega_3/\omega_5$ is not more than 1, a tension is applied to the resin sheet to cause the birefringence, resulting also in unsatisfactory transfer of the preformat pattern. On the other hand, when $\omega_3/\omega_5$ is more than 1.004, the birefringence may occur with difficulty, but the flatness of the resin sheet is lowered and also the resin sheet tends to slip on the roll stamper 3, resulting in a lowering of the transfer accuracy of the preformat pattern.

As resins used as materials for the substrate, thermoplastic resins having a high transmission to the light used for recording and reproduction are preferred, including, for example, acrylic resins, polyester resins, polycarbonate resins, vinyl resins, polysulfone resins, polyolefin resins, and cellulose resins.

The sheet for substrates used for optical recording medium, thus formed and having the convexity and concavity preformat pattern may be continuously passed through the step of cutting the sheet into individual substrates used for optical recording mediums, the step of forming a reflective layer, and also the step of forming a protective layer.

In the present invention, the convexity and concavity preformat pattern formed on the roll stamper corresponds to guide grooves or information pits formed on substrates used for optical recording mediums. It corresponds to a spiral track groove for an optical disk, having dimensions of, for example, a width of from 0.2 $\mu$m to 3.0 $\mu$m and particularly from 0.5 $\mu$m to 2 $\mu$m, and a pitch of from 0.1 $\mu$m to 15.0 $\mu$m and particularly from 1.0 $\mu$m to 5 $\mu$m; stripe-like track grooves for an optical card, of a width of from 1 $\mu$m to 10 $\mu$m and particularly from 2 $\mu$m to 5 $\mu$m, and an interval of from 5 $\mu$m to 20 $\mu$m and particularly from 8 $\mu$m to 15 $\mu$m; or rectangular information pits, of a length of 10 $\mu$m or less and a width of 10 $\mu$m or less, or elliptical information pits, of a major axis of 10 $\mu$m or less.

As having been described above, according to the present invention, the auxiliary layer comprising a metal or alloy different from the material for a stamper is provided on the back of the stamper, thereby improving the adhesion to a low-melting metal, and the roll substrate and the stamper are adhered using the low-melting metal. Thus, it has become possible to bring the former into close contact with the latter without any gap.

The improvement in adhesion between the roll substrate and the stamper has made it seldom for the stamper to peel, bringing about an improvement in the durability of roll stampers.

Moreover, since it is unnecessary for the roll stamper of the present invention to be secured with screws, the temperature of a roll substrate may only be raised to a temperature higher than the melting point of the low-melting metal when the stamper is removed. Thus, there is an advantage that maintenance can be performed with ease.

In the present invention, the stamper is fixed to the roll substrate while keeping uniform the thickness of the low-melting metal layer. This enables uniform conduction of heat to the stamper and hence the preformat pattern can be transferred to the resin sheet with a more improved performance.

EXAMPLES

The present invention will be described below in greater detail by giving Examples.

EXAMPLE 1

A photoresist (trade name: AZ-1300; a product of Hoechst Japan Ltd.) was applied to a glass master. A pattern corresponding to tracking grooves for an optical disk was exposed to light using a laser beam and developed with a developing solution (trade name: AZ312MIF; a product of Hoechst Japan Ltd.). A resist pattern of a tracking groove was thus formed.

As a pattern corresponding to a tracking groove for an optical disk, the pattern was made to correspond to a tracking groove provided in a spiral form with a pitch of 1.6 $\mu$m, a width of 1 $\mu$m and a depth of 1,000 Å in a doughnut-like region defined by two circles having respectively a radius of 64 mm and a radius of 29 mm.

Next, Ni was deposited by sputtering on the resulting resist pattern to make it conductive, and Ni was further deposited by electroforming to give a thickness of 100 μm. The surface (i.e., the back surface of a stamper) was mirror-polished to have a surface roughness of 0.5 μm. As an auxiliary layer, copper was further deposited thereon by sputtering to form a layer with a thickness of 1 μm, and mirror finishing was again carried out. The stamper thus formed was peeled from the glass master, followed by removal of resist, shaping, and then cleaning. A stamper with an auxiliary layer was thus prepared.

Then, the resulting stamper with an auxiliary layer was overlaid on a roll substrate with a diameter of 250 mm on the surface of which a 20 μm thick low-melting metal layer comprising a soldering alloy (melting point: 195° C.) had been formed by dipping, in the manner that the auxiliary layer came into contact with the low-melting metal layer. Thereafter, as illustrated in FIGS. 4A and 4B, a heated roll 18, heated to 210° C., was rotationally moved on the stamper 13 under application of a pressure of 1 kg/cm in linear pressure, so that the low-melting metal layer was melted and the stamper was fixed to the roll substrate. The resulting roll stamper was examined using an ultrasonic inspection machine to confirm that the interface between the auxiliary layer of the stamper and the roll substrate was filled with the soldering alloy without any gap. Peel strength required for peeling the stamper from the roll substrate was 20 kg/25 mm.

Subsequently, using the roll stamper according to the present Example, an apparatus as illustrated in FIG. 5 was set up, and substrates for optical disks were continuously prepared in the form of a sheet.

Polycarbonate (average molecular weight: 35,000; trade name: PANLITE 1-1250; a product of Teijin Chemicals Ltd.) was used as a material for resin pellets serving as a material for the substrates used for optical recording mediums.

Temperature of the T-die 12 was set to be 295° C.; extrusion width, to be 200 mm; diameter of the roll stamper 3, to be 250 mm; diameter and length of the pressure roll 4, to be 300 mm and 400 mm, respectively; and space between the roll stamper 3 and pressure roll 4 and space between the roll stamper 3 and pressure roll 5, to be 1.20 mm each. Rotational speeds $\omega_3$, $\omega_4$ of the roll stamper 3 and pressure roll 4 was set equal to each other and the ratio of the rotational speeds $\omega_3$, $\omega_5$ of the roll stamper 3 and the pressure roll 5 was set to be $\omega_3/\omega_5 = 1.004$.

Distance between the T-die and the point at which the resin sheet is pressed between the roll stamper 3 and the first pressure roll 4 was set to be 7.5 cm, and the resin sheet was transported at a speed of 2 m/min. with The roll stamper was heated to 140° C.

The apparatus was driven for 2 hours, during which preformat patterns for 305 sheets of optical disks were transferred to the resin sheet. As a result, there was seen no peeling of the stamper from the roll substrate.

Substrates for 305 sheets of optical disks were punched from the above sheet for substrates for optical disks, and recording layers were formed thereon to give 305 sheets of optical disks. The resulting optical disks were each set on an optical disk drive unit (trade name: OMS1000 Type-3, manufactured by Nakamichi K.K.; revolution number: 1,200 rpm) to perform reproduction. As a result, no tracking error occurred, showing that the preformat patterns were transferred with a good performance.

EXAMPLE 2

A roll stamper was prepared using as a stamper a nickel stamper of 150 μm in thickness and as a low-melting metal a soldering alloy melting at 220° C. First, of: end of the stamper was provisionally fixed with an instantaneous adhesive (SC55; a product of Sony Chemicals Corp.) to a roll substrate provided with a low-melting metal layer. A heated roll was pressed against it (linear pressure: 1.5 kg/cm) and the low-melting metal layer was heated to 230° C. While melting the soldering alloy, The heated roll was rolled from the state as shown in FIG. 4A to the state as shown in FIG. 4B under application of pressure, followed by cooling as it stands. The roll stamper was thus prepared.

The resulting roll stamper was heated to 140° C., and used as a molding roll as shown in FIG. 5. Preformat patterns were transferred to the resin sheet in the same manner as in Example 1. As a result, there was seen no gap between the auxiliary layer of the roll substrate and the stamper. Peel strength required for peeling the stamper at 25° C. was 22 kg/25 mm. The preformat patterns were also transferred with a good performance

EXAMPLE 3

In the step of preparing the nickel stamper in Example 1, the surface of the Ni-electroformed film was polished, and copper was deposited by sputtering to form an auxiliary layer with a thickness of 1 μm, followed by mirror-finishing. Thereafter, masking was made by sticking a silicone tape on the back surface of the auxiliary layer at the part corresponding to the part at which a preformat pattern is formed on the stamper, and thereafter etching was carried out by immersing the stamper with a glass master in a copper etchant to roughen the surface to a surface roughness of 20 μm. Thereafter, the silicone tape was peeled, and the stamper was also peeled from the glass master. A stamper with the auxiliary layer having thereon roughened areas and mirror-surface areas was thus prepared.

The stamper thus obtained was stuck to a roll substrate having thereon a low-melting metal layer, in the same manner as in Example 1. A roll stamper was thus prepared.

No gap was seen between the roll substrate and auxiliary layer of the resulting roll stamper. No gaps was also seen between the roughened areas and the roll substrate.

Peel strength required for peeling the stamper from the roll substrate at 25° C. was 23 kg/25 mm.

Using this roll stamper, an apparatus for preparing substrates used for optical disks as shown in FIG. 5 was set up in the same manner as in Example 1, and substrates for optical disks were continuously prepared in the form of a sheet. As a result, no peeling of the stamper occurred, and also preformat patterns were transferred with a good performance.

EXAMPLE 4

A stamper for an optical card, provided with an auxiliary layer, was prepared in the same manner as in Example 1, except that, as a pattern corresponding to tracking grooves of the optical card, the pattern was made to correspond to tracking grooves provided in parallel in the longitudinal direction to have dimensions of a pitch of 12 μm, a width of 3 μm and a depth of 2,700 Å, in a rectangular region of 300 mm in length and 200 mm in width, and also that silver was used as a material for the auxiliary layer.

Peel strength required for peeling the stamper thus prepared, from the roll substrate was 22 kg/25 mm. No gap was seen between the roll substrate and the auxiliary layer.

Then, using this roll stamper, an apparatus for preparing substrates used for optical cards was set up in the same manner as in Example 1, except that the spaces between the roll stamper 3 and the pressure rolls 4 and 5 were each adjusted so as for substrates for optical cards to have a thickness of 0.4 mm.

Using this apparatus, preformat patterns corresponding to 195 sheets of optical cards were transferred to a resin sheet. At this time, no peeling of the stamper from the roll substrate occurred. A sheet of the substrates for optical cards, thus obtained, was cut to give 195 sheets of substrates for optical disks, and then recording layers were formed thereon. Optical cards were thus obtained. The resulting optical disks were each set on a recording-reproducing unit manufactured by Canon Inc. to perform reproduction. As a result, no tracking servo error occurred, showing that the preformat grooves were transferred in a good state.

COMPARATIVE EXAMPLE

A roll stamper was prepared in the same manner as in Example 1, except that no auxiliary layer was formed on the back surface of the stamper. Here, the strength required for peeling the stamper was 5 kg/25 mm.

Using the resulting roll stamper, substrates for optical disks were prepared in the same manner as in Example 1. As a result, the stamper peeled from the roll substrate at the time when preformat patterns corresponding to 10 sheets of optical disks were transferred.

We claim:

1. A process for preparing a roll stamper for continuously preparing a substrate used for optical recording mediums, having a convexity and concavity preformat pattern, wherein said process for preparing a roll stamper comprises the steps of;

forming a low-melting metal layer on a roll substrate;

forming an auxiliary layer 16 on the back surface of a stamper having on its front a pattern corresponding with a convexity and concavity preformat pattern, with the auxiliary layer comprising a material different from the stamper;

overlaying the stamper on the roll substrate in such a manner that the low-melting metal layer comes into contact with the auxiliary layer; and thereafter melting the low-melting metal layer so that the stamper is fixed to the roll substrate.

2. A process for preparing a roll stamper according to claim 1, wherein the low-melting metal layer is melted by heating it to a temperature higher than the melting point thereof, using a heated roll which is rolled under pressure against the stamper so that the stamper is fixed to the roll substrate.

* * * * *

UNITED STATES PATENT AND TRADEMARK OFFICE
CERTIFICATE OF CORRECTION

PATENT NO. : 5,048,745
DATED : September 17, 1991
INVENTOR(S) : Tetsuya Sato, et al.

It is certified that error appears in the above-identified patent and that said Letters Patent is hereby corrected as shown below:

COLUMN 9:

Line 55, "with" should be deleted.

COLUMN 10:

Line 7, "of:" should read --an--.

COLUMN 12:

Line 15, "16" should be deleted and "the" should read --a--.

Line 16, "front" should read --front surface--.

Signed and Sealed this

Twentieth Day of April, 1993

*Attest:*

MICHAEL K. KIRK

*Attesting Officer*    Acting Commissioner of Patents and Trademarks